United States Patent
Feng et al.

(10) Patent No.: US 8,535,627 B1
(45) Date of Patent: Sep. 17, 2013

(54) KETONE/WATER MIXTURES FOR NOX REMOVAL

(71) Applicant: Southwest Research Institute, San Antonio, TX (US)

(72) Inventors: Maoqi Feng, San Antonio, TX (US); Rijing Zhan, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 0 days.

(21) Appl. No.: 13/712,201

(22) Filed: Dec. 12, 2012

(51) Int. Cl.
*B01D 53/56* (2006.01)
*B01D 53/92* (2006.01)
*B01D 53/94* (2006.01)

(52) U.S. Cl.
USPC ..... 423/212; 423/213.2; 423/235; 423/239.1; 60/282; 60/295; 60/299

(58) Field of Classification Search
USPC ............. 423/212, 213.2, 235, 239.1; 60/282, 60/295, 299
See application file for complete search history.

(56) References Cited

U.S. PATENT DOCUMENTS

| | | | |
|---|---|---|---|
| 3,867,507 A | | 2/1975 | Myerson |
| 5,227,145 A | * | 7/1993 | Kintaichi et al. ........... 423/239.1 |
| 5,279,997 A | * | 1/1994 | Montreuil et al. ............... 502/62 |
| 5,336,476 A | * | 8/1994 | Kintaichi et al. .......... 423/239.1 |
| 5,534,237 A | * | 7/1996 | Yoshida et al. ............ 423/239.1 |
| 6,399,035 B1 | * | 6/2002 | Tabata et al. ............... 423/213.5 |
| 2007/0207078 A1 | | 9/2007 | Nochi et al. |
| 2010/0055013 A1 | * | 3/2010 | Stakheev et al. ........... 423/213.5 |

FOREIGN PATENT DOCUMENTS

JP  55-49130 A  *  4/1980

OTHER PUBLICATIONS

Marcos Chaos, et al; An Experimental and Kinetic Study of Acetone Oxidation in a Flow Reactor, 31st International Symposium on Combustion, Aug. 6-11, 2006; University of Heidelberg, Germany.
F.O. Rice, et al; The Thermal Decomposition of Acetone in the Gaseous State; PROC. Nat'l. Acad. Sci., Aug. 2, 1929, vol. 15, pp. 702-705.
Takehiko Furusawa, et al; Nitric Oxide Reduction by Char and Carbon Monoxide: Fundamental Kinetics of Nitric Oxide Reduction in Fluidized-bed Combustion of Coal; Fuel, Sep. 1985, vol. 64, pp. 1306-1309.
Dennis E. Sparks, et al; Bi2O3/Al2O3 Catalysts for the Selective Reduction of NO With Hydrocarbons in Lean Conditions; Applied Catalysis B: Environmental 65 (2006) 44-54.

* cited by examiner

*Primary Examiner* — Timothy Vanoy
(74) *Attorney, Agent, or Firm* — Grossman, Tucker et al

(57) ABSTRACT

The present invention is directed at ketone/water mixtures for treating gas mixtures containing nitric oxides (NOx). The chemical reduction of NOx by the ketone/water mixture affords a relatively less objectionable combustion waste product for discharge into the atmosphere. The gas mixture for treatment of the ketone/water mixture may be preferably regulated to have a level of oxygen of at or below 5.0 vol. %.

20 Claims, 1 Drawing Sheet

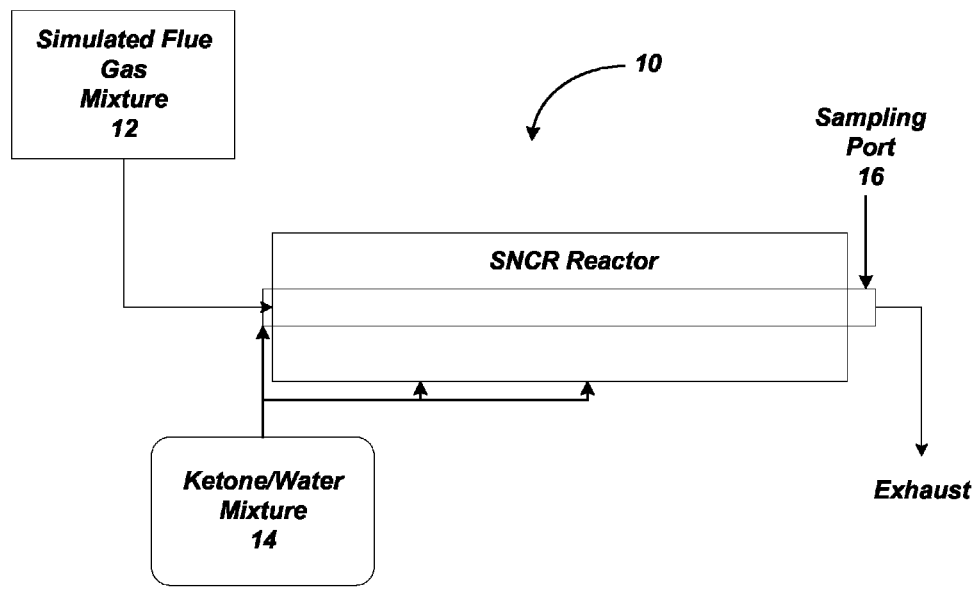

KETONE/WATER MIXTURES FOR NOX REMOVAL

FIELD OF THE INVENTION

The present invention relates to ketone/water mixtures for treating gas mixtures containing nitric oxides (NOx). The chemical reduction of NOx by the ketone/water mixture affords a relatively less objectionable combustion waste product for discharge into the atmosphere.

BACKGROUND

Nitric oxides ($NO_x$), mainly consisting of nitric oxide (NO) and nitrogen dioxide ($NO_2$), are relatively toxic pollutants formed during a combustion processes. Such pollutants may be present in exhaust gases discharged from gas engines, gas turbines in aircraft, diesel engines and in power generation. Increasing concerns over air quality and new regulations have forced, and will continue to force the installation of NOx emissions control systems.

Selective noncatalytic reduction (SNCR) technology is one of the technologies that has been used for NOx removal, in which a reducing agent, usually ammonia (or urea) is added to the combustion gas stream. The ammonia reduces NO molecules present according to the reaction:

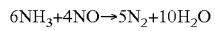

$$6NH_3 + 4NO \rightarrow 5N_2 + 10H_2O$$

However, the current SNCR efficiency is reportedly around 30-60% which is much lower than that of Selective Catalytic Reduction (SCR) technology. While SNCR technology does not rely upon a catalyst, its relatively low conversion makes it difficult to achieve economic competitiveness versus SCR technology, which operates at relatively lower temperature with the assistance of a catalyst.

SUMMARY

A process to reduce NOx emissions comprising supplying a gas mixture containing NOx and oxygen wherein the gas mixture has a level of oxygen of at or below 5.0 vol. %. This may then be followed by introduction of an aliphatic ketone/water mixture to the gas mixture wherein the aliphatic ketone has the following formula:

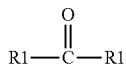

wherein R1 is an alkyl group or isomer thereof comprising —$CH_3$, —$CH_2CH_3$ or —$(CH_2)nCH_3$ where n has a value of 0-5 and wherein said ketone is present at 1-50% (vol) in the aliphatic ketone/water mixture. This may be followed by heating the gas mixture containing the aliphatic ketone/water mixture to a temperature of 600° C. to 1200° C. and removing 50% or more of the NOx from the gas mixture. The process may be applied to an exhaust gas mixture and the aliphatic ketone may include acetone.

BRIEF DESCRIPTION OF THE DRAWINGS

The above-mentioned and other features of this disclosure, and the manner of attaining them, will become better understood by reference to the following description of embodiments described herein taken in conjunction with the accompanying drawings, wherein:

FIG. 1 is the SNCR reactor utilized for the selective non-catalytic reduction procedure employed herein employing a ketone/water mixture as NOx reducing agent.

DETAILED DESCRIPTION

The present disclosure is directed at a NOx removal process of exhaust gas that employs a ketone/water mixture as a reducing agent that may be specifically applied for selective non-catalytic reduction technology (SNCR). Accordingly, the NOx removal process herein may operate in the complete absence of a catalyst that may otherwise be employed in selective catalytic reduction (SCR) systems. It is to be understood that reference to NOx herein is reference to a family of air contaminants that include mono-nitrogen oxides. Such contaminants may therefore specifically include nitric oxide (NO) which is a colorless, odorless gas as well as nitrogen dioxide ($NO_2$) which is a brown, pungent gas.

The ketones that are contemplated for use herein preferably include aliphatic ketones of the following general formula:

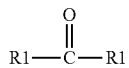

wherein R1 is an alkyl group, or an isomer thereof, including —$CH_3$, —$CH_2CH_3$, or —$(CH_2)_nCH_3$ where n may have a value of 0-5. Preferably, the ketone is selected from acetone. In addition, as noted, the ketones herein are mixed with water prior to their introduction into a reactor for use as a NOx reduction agent. Accordingly, the ketones are initially prepared as a mixture with water wherein the ketone is present at 1-50% (vol) of the ketone/water mixture. Preferably, the ketone may be present at 1-25% (vol) in the ketone/water mixture, and more preferably, at 1-15% (vol), and in a most preferred embodiment, at a level of 8-12% (vol).

In addition, the ketone vapor concentration that may be present after introduction of the ketone/water mixture into the SNCR furnace may be in the range of 2-20 times the NOx concentration in the gas for treatment. For example, if the NOx concentration in the gas for treatment is 200 ppm, the ketone vapor concentration may be adjusted to range from 400 ppm to 4000 ppm.

FIG. 1 illustrates at 10 a selective noncatalytic reduction (SNCR) system that was employed to evaluate the use of the now disclosed ketone/water mixture as a NOx reducing agent. The SNCR reactor itself may include one or two furnaces to provide a temperature for reduction between 800-900° C. However, in the broad context of the present invention, the temperature for reduction with the ketone/water mixture may be in the range of 600° C. to 1200° C. A simulated flue gas mixture 12 was provided that contained nitrogen, NOx (a mixture of NO and $NO_2$ diluted in nitrogen), oxygen, carbon dioxide, sulfur dioxide and water vapor. The ketone/water mixture 14 was introduced at the front end of the SNCR. However, multiple ports may be utilized. A sampling port 16 is provided at one end of the SNCR. Samples of exhaust gas were then collected and the following test results were obtained.

Example 1

A simulated flue gas mixture containing 200 ppm NOx, 10 vol % $CO_2$, 6 vol % water vapor, the balance being nitrogen, was introduced through the SNCR reactor. A mixture of 10 vol % acetone in water was delivered to the system with a pump and the acetone vapor concentration was 1,500 ppm. The SNCR temperature was 850° C. Analytical results showed that 100% NOx removal was achieved.

Example 2

A simulated flue gas mixture containing 350 ppm NOx, 11 vol % $CO_2$, 6 vol % water vapor, the balance being nitrogen, was introduced through the SNCR reactor. A mixture of 10 vol % acetone in water was delivered to the system with a pump and the acetone vapor concentration was 1,500 ppm. The reactor temperature was 850° C. Analytical results showed that 100% NOx removal was achieved.

Example 3

A simulated flue gas containing 400 ppm NOx, 13 vol % $CO_2$, 6 vol % water vapor, the balance being nitrogen, was introduced through the SNCR reactor. A mixture of 10 vol % acetone in water was delivered to the system with a pump and the acetone vapor concentration was 1,500 ppm. The reactor temperature was 850° C. Analytical results showed that 100% NOx removal was obtained.

Example 4

A simulated flue gas containing 450 ppm NOx, 13 vol % $CO_2$, 6 vol % water vapor, the balance being nitrogen, was introduced through the SNCR reactor. A mixture of 10 vol % acetone in water was delivered to the system with a pump and the acetone vapor concentration was 1,500 ppm. The reactor temperature was 850° C. Analytical results showed that 100% NOx removal was obtained.

Example 5

A simulated flue gas containing 480 ppm NOx, 13 vol % $CO_2$, 6 vol % water vapor, the balance being nitrogen, was introduced through the SNCR reactor. A mixture of 10 vol % acetone in water was delivered to the system with a pump; the acetone vapor concentration was 1,500 ppm. The reactor temperature was 850° C. Analytical results showed that 100% NOx removal was obtained.

Example 6

A simulated flue gas containing 480 ppm NOx, 0.15 vol % $O_2$, 14 vol % $CO_2$, 6 vol % water vapor, the balance being nitrogen, was introduced through the SNCR reactor. A mixture of 10 vol % acetone in water was delivered to the system with a pump and the acetone vapor concentration was 1,500 ppm. The reactor temperature was 850° C. Analytical results showed that 98.2% NOx removal was obtained.

Example 7

A simulated flue gas containing 480 ppm NOx, 0.3 vol % $O_2$, 14 vol % $CO_2$, 6 vol % water vapor, the balance being nitrogen, was introduced through the SNCR reactor. A mixture of 10 vol % acetone in water was delivered to the system with a pump and the acetone vapor concentration was 1,500 ppm. The reactor temperature was 850° C. Analytical results showed that 96.1% NOx removal was obtained.

Example 8

A simulated flue gas containing 250 ppm NOx, 10 vol % $O_2$, 14 vol % $CO_2$, 6 vol % water vapor, the balance being nitrogen, was introduced through the SNCR reactor. A mixture of 10 vol % acetone in water was delivered to the system with a pump and the acetone vapor concentration was 1,500 ppm. The reactor temperature was 850° C. Analytical results showed that 34.0% NOx removal was obtained.

As can be seen from the above, the introduction of a ketone/water mixture into a SNCR reactor can now be configured to provide quantitative (100%) NOx removal. The level of NOx removal with the ketone/water mixture was also observed to drop if the level of $O_2$ in the gas mixture increased. Accordingly, it is contemplated herein that the acetone/water mixture may now be best introduced into those exhaust gases where the level of oxygen is regulated at or below 5.0 vol %. At or below 5.0 vol % oxygen, the acetone/water mixture may then provide NOx removal at levels of 50% or greater, and in the range of 50%-100%. More specifically, when the level of oxygen in the exhaust gas is regulated to be at a level at or below 1.0 vol. %, the level of NOx removal with a ketone/water mixture may be at a level of 90% or greater. When the level of oxygen in the exhaust gas is regulated to be at a level of at or below 0.5 vol. %, the level of NOx removal may be at a level of 95% or greater.

Without being bound by any particular theory, it is noted that the possible reactions for NOx removal with acetone may be as follows:

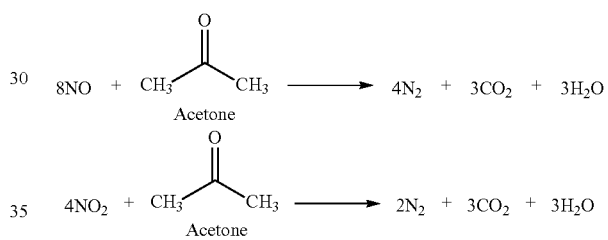

Accordingly, both NO and $NO_2$ can both be reduced by acetone to nitrogen. The carbon and oxygen atoms in acetone are simultaneously converted to $CO_2$ and water. A possible mechanism is as follows:

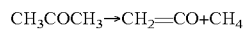

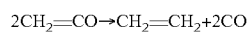

As can be seen, acetone in the reactor may decompose to ketene ($CH_2$=CO) which may further decompose to ethylene and CO.

There are then two potential pathways for NOx conversion:

(1) NO reduction to $N_2$ by CO according to the following equation:

(2) NOx reduction by the hydrocarbons produced from the decomposition of acetone according to the following equation:

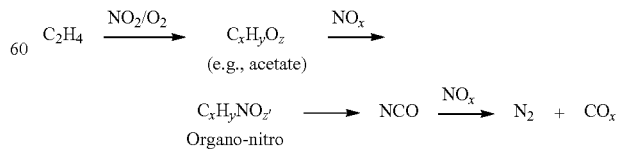

As can be seen, it is generally considered that nitrogen-containing compounds, CxHyNOz, are precursors to —NCO (isocyanate) species. Among the possible intermediates formed, organo-nitro compounds (RNO$_2$) are believed to act as precursors to such isocyanates.

The possible synergistic influence of water, as observed herein, may be base upon the reaction of an OH free radical with acetone as follows:

.OH+CH$_3$C(O)CH$_3$→CH$_3$C(O)CH$_2$.+H$_2$O ΔH°=−21.0 kcal/mol

.OH+CH$_3$C(O)CH$_3$→CH$_3$C(O)OH+CH$_3$. ΔH°=−25.7 kcal/mol

The first of the above reactions is possible H atom abstraction from acetone to produce the radical intermediate CH$_3$C(O)CH$_2$. and water. Such radical intermediate CH$_3$C(O)CH$_2$. may then react with NO for NO removal. The second possibility is .OH addition to the carbonyl group of acetone which may lead to the formation of acetic acid and a methyl radical, which may then abstract a hydrogen from its surrounding and form methane (CH$_4$). The methane so formed my then lead to NOx removal according to the following potential reaction:

CH$_4$+2NO+O$_2$→N$_2$+CO$_2$+2H$_2$O

Regardless of the possible reaction pathways or possible mechanisms, as noted above, the results are that the acetone/water mixture herein is an effective reducing agent for NOx removal, and in particular, when levels of oxygen in the exhaust gas is regulated as indicated. Some advantages of the use of the acetone/water mixture may be listed as follows: (1) acetone/water mixtures are less expensive than ammonia or urea; (2) acetone/water evaporation is relatively easier than ammonia or urea (reagents that have been used for NOx removal); (3) acetone/water is relatively non-corrosive; (4) acetone/water is relatively non-toxic; and (5) oxidation of acetone will not itself produce NOx.

However, aside from the above, the ketone/water mixture herein, while preferably utilized in a non-catalyzed system, may be used in conjunction with catalysis, such as in SCR technology. Accordingly, NO$_x$ reduction herein with the acetone/water mixture may take place in the presence of ammonia or urea or in the presence of hydrocarbons. In addition, as may now be appreciated, the source of the aliphatic ketone employed herein may be derived directly from decomposition of other components of the gas targeted for NOx removal.

It may also be appreciated that the process herein for reducing NOx emissions from an exhaust gas mixture may readily be applied to remove NOx emissions from a variety of sources. This may include, but not be limited to, exhaust gases from vehicular engines in automobiles and trucks (internal combustion and/or diesel type engines), turbine engines, and/or exhaust gases from industrial output location such as power generation facilities.

Although the foregoing invention has been described in some detail by way of illustration and example for purpose of clarity and understanding, it will be apparent to those skilled in the art that certain changes and modifications will be practiced. Therefore, the description and examples should not be construed as limiting the scope of the invention, which is delineated by the appended claims.

The invention claimed is:

1. A process to reduce NOx emissions from a gas mixture comprising:
supplying a gas mixture containing NOx and oxygen wherein said gas mixture has a level of oxygen of at or below 5.0 vol. %;
introducing an aliphatic ketone/water mixture to said gas mixture wherein the aliphatic ketone has the following formula:

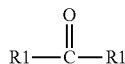

wherein R1 is an alkyl group or isomer thereof comprising —CH$_3$, —CH$_2$CH$_3$ or —(CH$_2$)nCH$_3$ where n has a value of 0-5 and wherein said ketone is present at 1-50% (vol) in said aliphatic ketone/water mixture;
heating said gas mixture containing said aliphatic ketone/water mixture to a temperature of 600° C. to 1200° C.;
removing 50% or more of said NOx from said gas mixture.

2. The process of claim 1 wherein the level of oxygen in said gas mixture is at or below 1.0 vol. % wherein 90% or more of said NOx is removed from said gas mixture.

3. The process of claim 1 wherein the level of oxygen in said gas mixture is at or below 0.5 vol % wherein 95% or more of said NOx is removed from said gas mixture.

4. The process of claim 1 wherein said NOx removal is achieved in the absence of any catalytic removal of said NOx.

5. The process of claim 1 wherein said aliphatic ketone is present as a vapor in said gas mixture and wherein said gas mixture has a NOx concentration and said ketone vapor concentration is in the range of 2-20 times said NOx concentration.

6. The process of claim 1 wherein said temperature is 800° C. to 900° C.

7. The process of claim 1 wherein said ketone is present at 1-25% (vol) in said aliphatic ketone/water mixture.

8. The process of claim 1 wherein said ketone is present at 1-15% (vol) in said aliphatic ketone/water mixture.

9. The process of claim 1 wherein said ketone is present at 8-12% (vol) in said aliphatic ketone/water mixture.

10. The process of claim 1 wherein said gas mixture comprises NO and NO$_2$.

11. The process of claim 1 wherein said method is applied to an exhaust gas mixture.

12. The process of claim 1 wherein said method is applied to an exhaust gas mixture from a vehicular engine.

13. The process of claim 1 wherein said method is applied to a turbine engine.

14. The process of claim 1 wherein said method is applied to an exhaust gas from a power generation facility.

15. A process to reduce NOx emissions from a gas mixture comprising:
supplying a gas mixture containing NOx and oxygen wherein said gas mixture has a level of oxygen of at or below 5.0 vol. %;
introducing an acetone/water mixture to said gas mixture wherein acetone is present at 1-50% (vol) in said acetone/water mixture;
heating said gas mixture containing said acetone/water mixture to a temperature of 600° C. to 1200° C.;
removing 50% or more of said NOx from said gas mixture.

16. The process of claim 15 wherein the level of oxygen in said gas mixture is at or below 1.0 vol. % wherein 90% or more of said NOx is removed from said gas mixture.

17. The process of claim 15 wherein the level of oxygen in said gas mixture is at or below 0.5 vol. % wherein 95% or more of said NOx is removed from said gas mixture.

18. The process of claim 15 wherein said NOx removal is achieved in the absence of any catalytic removal of NOx.

19. The process of claim 15 wherein said acetone is present as a vapor in said gas mixture and wherein said gas mixture has a NOx concentration and said acetone vapor concentration is 2-20 times said NOx concentration.

20. The process of claim 15 wherein said temperature is 800° C. to 900° C.

* * * * *